United States Patent [19]

Bartholomew et al.

[11] 3,715,187

[45] Feb. 6, 1973

[54] METHOD OF REMOVING SULPHUR DIOXIDE AND NITROGEN DIOXIDE FROM GASES

[75] Inventors: Roger F. Bartholomew, Corning; Harmon M. Garfinkel, Horseheads, both of N.Y.

[73] Assignee: Corning Glass Works, Corning, N.Y.

[22] Filed: April 14, 1971

[21] Appl. No.: 134,082

[52] U.S. Cl. .................................. 423/235, 423/242
[51] Int. Cl. .............................................. C01b 17/22
[58] Field of Search ......... 23/2, 2 E, 102 A, 129, 161

[56] References Cited

UNITED STATES PATENTS

| | | | |
|---|---|---|---|
| 3,438,722 | 4/1969 | Heredy et al. | 23/2 |
| 3,511,594 | 5/1970 | Lenz et al. | 23/2 |
| 3,533,748 | 10/1970 | Finfer et al. | 23/226 |
| 2,375,758 | 5/1945 | Bates | 23/102 A |
| 3,552,912 | 1/1971 | Bartholomew et al. | 23/2 |
| 3,563,029 | 2/1971 | Lowes | 23/2 K |

OTHER PUBLICATIONS

"Chemical Abstracts" Vol. 71, 1969, p. 234, No. 15835r
Ubbelohde, A. R.; "Chemistry and Industry" London, March 9, 1968, pp. 313–315

Primary Examiner—Oscar R. Vertiz
Assistant Examiner—George O. Peters
Attorney—Clarence R. Patty, Jr., Clinton S. Janes, Jr. and James A. Giblin

[57] ABSTRACT

Method of removing $SO_2$ and $NO_2$ or $SO_2$ alone from gaseous mixtures passing the gaseous mixtures through a molten bath of sodium hydroxide and/or potassium hydroxide.

4 Claims, No Drawings

METHOD OF REMOVING SULPHUR DIOXIDE AND NITROGEN DIOXIDE FROM GASES

BACKGROUND OF THE INVENTION

This invention relates to the removal of toxic gases from gaseous mixtures before the gaseous mixtures are released into the atmosphere. More particularly, the present invention contemplates the removal of $SO_2$ and $NO_2$ or $SO_2$ alone from a gaseous mixture in a simple and economical manner.

$SO_2$ and $NO_2$ are two particularly noxious gases produced as by-products in many industrial operations. The production of $SO_2$ as a troublesome by-product is often associated with the burning of sulfur-containing coals and the roasting of metal sulfide ores to produce metals such as copper. $NO_2$ is often expelled in those industrial operations where nitrates are used as batch materials such as in the glass manufacturing industry.

Further, both $SO_2$ and $NO_2$ are associated with automobile exhaust emissions and the control of those emission products has been a subject of study for a great number of pollution control investigators.

The above gases are not only undesirable because of their noxious presence in the atmosphere, but also because they promote numerous, complex, chemical reactions with other available substances which produce yet further undesirable products. Thus, it has long been recognized that, in attempting to maintain the environment in its natural state, man must be able to prevent, or at least reduce, emissions of $SO_2$ and $NO_2$ into the atmosphere.

Numerous methods have been devised for preventing toxic gases from escaping into the atmosphere. To realize economies in removing such gases, yet further methods have been devised for recovering useful products from such undesirable gases as $SO_2$. Thus, for example, there are methods for recovering sulfur or sulfuric acid from gases containing $SO_2$ so that costs incident to $SO_2$ removal can be minimized. For the most part, however, such known processes for removing toxic gases are expensive and the costs of removal are rarely recovered in converting the gases to useful by-products, especially when the amounts of gases such as $SO_2$ are too low to make sulfur recovery operations feasible. Thus, recent attention has been directed toward not only recovering valuable products from gases such as $SO_2$, but also toward economically removing such gases without the benefit of by-product recovery. In those cases, where the amounts of noxious gases to be removed are too low to permit installation of by-product recovery equipment, special attention has been directed toward removing unwanted gases in the most practical and economical method.

PRIOR ART

There are several known methods for removing such unwanted gases as $SO_2$ and $NO_2$ which involve passing the gases through aqueous solutions or molten material baths. Also, there are methods for removing gases such as $SO_2$ which involve contacting such gases with solid materials. Thus, for example, U. S. Pat. No. 3,438,722 teaches the removal of $SO_2$ from flue gases by absorption of the $SO_2$ in a molten alkali metal carbonate mixture. The absorbant in that disclosure may be regenerated and commercial sulfur values are recovered.

U. S. Pat. No. 3,475,122 teaches a method of recovering $SO_2$ from a gas stream by passing the gas stream through an aqueous basic solution such as KOH to form a predominantly bisulfite solution. That solution is then further treated so that the $SO_2$ can be recovered and collected and the solution is returned to its original caustic state for further SOremoval.

Canadian Pat. No. 843,763 describes the removal of gases such as $SO_2$ by contacting gases containing $SO_2$ with granular alkali hydroxide.

U. S. Pat. No. 3,552,912, issued to the present applicants, discloses the removal of both $SO_2$ and $NO_2$ from gas mixtures by passing the gas mixture into successive baths of a molten nitrate (to remove $SO_2$) and a molten hydroxide (to remove $NO_2$). Alternatively, that patent teaches that the gas mixture may be passed through a single bath consisting of molten nitrates and hydroxides to effectively remove both $SO_2$ and $NO_2$ in one step.

Unfortunately, all of the above methods for removing $SO_2$ and/or $NO_2$ have certain disadvantages when considered alone or in combination. Thus, for example, the method for removing $SO_2$ from a gas by passing it through a molten carbonate bath has two distinct disadvantages. First, the disclosed method is specific to $SO_2$ and has not been shown to be feasible in removing other toxic gases such as $NO_2$. Second, even the optimum carbonate melt disclosed requires the costly maintainence of a temperature of at least 350°C.

The method for $SO_2$ removal based on passing gases through an aqueous basic solution likewise has certain disadvantages. Again, that method is specific to $SO_2$ removal, and since it is part of a cyclic sulfur recovery process, it presupposes sufficient $SO_2$ present to make the overall process feasible because of the requirement of added equipment. Further, the utility of passing $SO_2$ through an aqueous caustic solution is limited by the concentration of hydroxide present which determines the maximum $SO_2$ removal.

The removal of gases such as $SO_2$ by contacting them with a granular form of metal alkali hydroxide also has certain disadvantages. Although contact with granules of metal hydroxides will remove gases other than $SO_2$ (e.g. $CO_2$, $Cl_2$, or HCL), there is no teaching that such contact will also efficiently remove $NO_2$. Further, the removal rate is limited because of the granular form of the caustic material which has a limited surface area available for contact with gases.

The removal of $SO_2$ and $NO_2$ by passing those gases through successive baths of molten nitrates and hydroxides or through a combined bath of molten nitrates and hydroxides has been demonstrated as being a relatively simple, inexpensive, and efficient method for removing both $SO_2$ and $NO_2$. However, even that method has certain disadvantages that must be considered when a more economical method for removing both $SO_2$ and $NO_2$ is desired. Thus, for example, if two successive baths are utilized, there are added costs in maintaining two separate elevated temperatures. Further, if product recovery operations are being considered, there are added costs in having to treat the separate spent baths to regenerate them. Even if a unitary bath of molten nitrates and hydroxides is used, there are economic disadvantages in having to maintain relatively high melt temperatures. Further, if bath regeneration techniques are being considered, added costs can be anticipated in having to regenerate a melt consisting of both spent nitrates and spent hydroxides.

It should be noted that the above and other disadvantages are commonly considered whenever plans are made for determining the most efficient and economical method for removing undesirable gases such as $SO_2$ and/or $NO_2$. Thus, there is presently a need for a method for removing $SO_2$ and/or $NO_2$ that will overcome the above disadvantages.

SUMMARY OF THE INVENTION

We have discovered, quite surprisingly, that both $SO_2$ and $NO_2$ can be efficiently removed from gases in a one step operation by passing the gases through a molten bath of one or more alkali metal hydroxides. In its preferred embodiment, the present invention contemplates the removal of $SO_2$ and $NO_2$ by passing those gases through a molten bath comprising at least one member selected from the group consisting of sodium hydroxide and potassium hydroxide. In an even more preferred embodiment, the gases are passed through an equimolar molten bath of sodium hydroxide and potassium hydroxide. In this invention, baths of sodium hydroxide and/or potassium hydroxide are used for economy purposes only for it is thought other more expensive alkali metal hydroxides such as the hydroxides of lithium, caesium, rubidium, etc., could also employ the principles of the present invention.

SPECIFIC EMBODIMENTS

It was known from U. S. Pat. No. 3,552,912 that $NO_2$ alone could be removed from a gaseous mixture by passing the gas through a molten bath of alkali metal hydroxide(s). In that disclosure, it was shown that the $NO_2$ removal could be described by the overall equation

where M + K and/or Na and the $MNO_2$ and $MNO_3$ were found compatible with the bath. The removal of $SO_2$ from the same gaseous mixture required passing the gases through a molten nitrate bath before using the hydroxide bath. Alternatively, both $SO_2$ and $NO_2$ could be removed by passing both gases through a unitary bath consisting of molten nitrates and molten hydroxides. Overall, it was determined that the minimum temperature at which the melts would efficiently remove both $SO_2$ and $NO_2$ was about 325°C. Even though that temperature is low enough to make the removal process economically feasible, further studies were made to find an even more economical removal system.

Surprisingly, it has been found that the use of a molten nitrate bath was unnecessary for the effective removal of both $SO_2$ and $NO_2$. It was discovered that $SO_2$ could also be removed by an alkali metal hydroxide bath, thus reducing the removal costs. Further, it was discovered that by using an equimolar mixture of sodium hydroxide and potassium hydroxide for the bath, a bath temperature as low as about 170°C. could be used to efficiently remove the gases.

In the following illustrative examples, reagent grade sodium hydroxide and potassium hydroxide were used and they were air dried at 130°C. prior to being used. Anhydrous grade $SO_2$ (99.98 percent minimum purity) and $NO_2$ of 99.5 percent minimum purity were used. The gases were dried by passing them through a column of Mg $(ClO_4)_2$ prior to being introduced into the reaction vessels holding the molten hydroxides. The hydroxide melts were fused in zirconium or nickel curcibles, as indicated, and the reactions were followed by examining the infrared spectra (gas cell) of the gaseous reaction products and the quenched melts (KBr technique) before, during, and after the reactions. Analyses of solid spectra were achieved by comparison with a collection of control spectra of pure compounds.

To monitor the reactions better in the examples below, inasmuch as the reactions thereof are extremely rapid, an atmosphere of argon was maintained above the molten baths at all times and the $SO_2$ and/or $NO_2$ was swept into the reaction vessels with argon. The use of argon atmosphere also served to eliminate any complications that could arise from $CO_2$ pick-up from the air by the melt surface. The reaction vessels were placed in a closed system so that the effluent gases could be collected in bulbs attached to a vacuum rack.

Example I

About 50 grams (about 0.9 moles) of KOH was melted and maintained in a zirconium curcible at about 440°C. The depth of the melt was approximately 3 cm. $SO_2$ at a flow rate of 100 ml/min. was mixed with argon and introduced into the melt through a nickel tube of ¼ inch inner diameter which extended into the melt to a depth of about one half of the melt depth. The reaction between the $SO_2$ and the molten hydroxide was found to be very rapid. The overall reaction can be described as

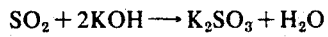

The presence of sulfite was demonstrated by both chemical tests and infrared spectra of the quenched melt after the $SO_2$ had passed through the melt for 20 minutes. The absence of bands attributable to sulfate and other sulfur containing salts ruled out the presence of those compounds.

Example II

About 140 grams of an equimolar mixture of sodium hydroxide and potassium hydroxide was melted and maintained in a nickel crucible at 400°C. A mixed stream of $SO_2$ and $NO_2$ was passed into the melt through a nickel tube of ¼ inch inner diameter. Prior to passage into the melt, the $SO_2$ was passed through a flow meter into liquid $NO_2$ which was contained in a reservoir. The flow rate after passage through the liquid $NO_2$ was approximately 2 ½ times that of the gas passing into the $NO_2$ indicating that the $SO_2 + N_2O_4$ mixture was one part $SO_2$ to about 1 ½ parts $N_2O_4$ so that at the melt temperature the mixture represented about one part $SO_2$ to three parts $NO_2$, which, on a volume basis, represented about 25% $SO_2$ and 75% $NO_2$. The flow rate at the bath temperature was approximately 100 ml/min. The gas mixture was passed through the melt for 30 minutes and quenched samples of the melt were taken at 5, 15, and 30 minute intervals after the initial reaction.

Inspection of these quenched samples in KBr pellets showed evidence of nitrate, nitrite, and sulfate, the representative peaks being larger for the longer reaction times. It was noted that in the earlier reaction between $SO_2$ and hydroxide, the infrared spectra showed the presence of sulfite, in contrast to the sulfate found in this example. This difference can be explained on the basis of previous work where sulfite was shown to react with $NO_2$ to give sulfate. Thus, in this example the sulfite produced in the initial reaction between $SO_2$ and the hydroxide was further oxidized to sulfate in the presence of $NO_2$.

The effluent gas throughout the above examples showed no sign of being acidic. This was demonstrated by the fact that pH indicator paper held above the melt showed, if anything, an alkaline effluent.

After the reaction, the melt was dissolved in water and aqueous barium nitrate was added. A white precipitate was obtained which did not dissolve in concentrated HCl. This demonstrated the presence of the sulfate.

It is noted that the hydroxide bath efficiently removed both the $SO_2$ and $NO_2$. The flow rate of 100 ml/min. after 30 minutes amounted to 1.3 liters of gas at STP; that is about 0.05 moles of gas which used up less then 0.1 mole (or about 6 grams) of the melt. Thus, a buildup of sulfate, nitrate, and nitrite was not expected to, and did not, cause the melt to freeze.

Example III

Because of the success found in using an equimolar melt of NaOH and KOH, a further experiment was done to determine the lowest possible temperature at which a gas could be removed by such a melt. It was noted that NaOH and KOH had melting points of 322°C and 410°C, respectively. However, it was found that an equimolar mixture of the two hydroxides melted at about 170°C. A 50 gram equimolar mixture of NaOH and KOH was melted in a zirconium crucible and maintained at a temperature slightly above 170°C. $NO_2$ was passed into the melt at a rate of 250 ml/min for 10 minutes through a nickel tube (¼ inch inner diameter) which extended ½ way into the melt which had a depth of about 3 cm. The reaction was observed to proceed very quickly and no brownish effluent attributable to $NO_2$ was noted. Analysis of the reaction products indicated the presence of both nitrate and nitrite, as was expected.

For fuel economies, and to avoid corrosion of the container by the melt, the maximum temperature of the bath has been found to be about 525°C. Although the reaction in the melt was found to be very rapid even when the temperature was slightly above 170°C, it is appreciated that the reaction rate varies exponentially with the temperature.

Inasmuch as the rates of reaction are very rapid even at the low temperature indicated, the flow of gas into the melt must be fast enough to prevent the buildup of solid reaction products across the gas entry duct thereby stopping the flow of gas therethrough. The maximum flow rate is determined by such factors as excessive turbulence caused in the melt, the carryover of solid reaction product into the exit duct due to the excessive turbulence, incomplete reaction of the gas with the melt, etc. Nevertheless, the proper rate of gas flow can be readily determined empirically and is believed to be well within the technical competence of one of ordinary skill in the art.

The rapid reactions of $NO_2$ and $SO_2$ described above, with water as the only gaseous product, thus show a simple, economical method for removing $SO_2$ and/or $NO_2$ from waste gases. Since the above invention is based on contacting $SO_2$ and/or $NO_2$ with molten baths of alkali metal hydroxides, it is obvious that such contact could be maximized in two ways. The first way would be to maximize the depth of the molten bath through which $SO_2$ and/or $NO_2$ were passed. The second way would be to increase the amount of the molten hydroxide available for contact with the $SO_2$ and/or $NO_2$. Thus, by placing the molten hydroxide in a column and passing $SO_2$ and/or $NO_2$ through the bottom of the column and allowing those gases to pass upwardly through the column, thorough contact with the molten bath is assured.

Further, to allow continuous $SO_2$ and $NO_2$ removal, several hydroxide baths can be utilized in the so-called cascade type process to permit removal of spent baths without disrupting the overall removal process.

In practice, the presence of oxygen would result in rapid oxidation of the sulfite to sulfate at the bath temperatures. It should be noted that, if desired, regeneration of the spent hydroxide baths could be accomplished by several well known methods to remove the sulfates, nitrates, and nitrates from the bath.

The temperature of the molten bath should be as low as possible to be economical, yet high enough for complete removal of $SO_2$ and/or $NO_2$. Thus, in a preferred economical embodiment, a user of the present invention would want to use the lowest temperature possible consistant with the anticipated $SO_2$ and/or $NO_2$ emissions, the amount of bath utilized, and the respective costs of sodium and potassium hydroxides that would be combined to produce the most feasible low temperature bath.

We claim:

1. A method for removing sulfur dioxide and nitrogen dioxide from a gaseous environment which comprises passing the gaseous environment through a molten bath consisting initially of only at least one member selected from the group consisting of sodium hydroxide and potassium hydroxide.

2. The method, as claimed in claim 1 wherein the molten bath comprises an equimolar mixture of sodium hydroxide and potassium hydroxide.

3. The method, as claimed in claim 1, wherein the molten bath is maintained at a temperature between about 170° and 525°C.

4. The method, as claimed in claim 1, wherein the molten bath comprises an equimolar mixture of sodium hydroxide and potassium hydroxide and the bath is maintained at a temperature between about 170°C and 525°C.

* * * * *